United States Patent [19]

Miley

[11] Patent Number: 4,617,754
[45] Date of Patent: Oct. 21, 1986

[54] ARTICULATED FLY SWATTER

[76] Inventor: Steve Miley, P.O. Box 6653, Mesa, Ariz. 85206

[21] Appl. No.: 732,853

[22] Filed: May 13, 1985

[51] Int. Cl.⁴ .............................................. A01M 3/02
[52] U.S. Cl. ...................................................... 43/137
[58] Field of Search ......................................... 43/137

[56] References Cited

U.S. PATENT DOCUMENTS 196,802  11/1877  Hill ........................................ 43/137
2,545,215  3/1951  Sharpe .................................. 43/137

FOREIGN PATENT DOCUMENTS 909914  5/1946  France ................................... 43/137
227289  1/1925  United Kingdom .................. 43/137

Primary Examiner—Gene P. Crosby
Attorney, Agent, or Firm—Warren F. B. Lindsley

[57] ABSTRACT

A fly swatter has a hinged flange portion which allows the swatter to bend 90° so as to be effective against flies and other insects in corners.

8 Claims, 4 Drawing Figures

ARTICULATED FLY SWATTER

BACKGROUND OF THE INVENTION

1. Field of the Invention

The instant invention relates to insect swatters. More particularly, the instant invention relates to insect swatters which are effective against insects in corners and other difficult to reach places.

2. Prior Art and Technical Considerations

Fly swatters or more specifically insect swatters, generally have a relatively wide flail portion which is used to hit and kill the insect, which flail portion is secured by an elongated strut to a handle. Generally, the flail portion is planar and flexes out of the plane in a direction generally perpendicular to the extent of the handle. In order to substantially increase the chances that one will hit the fly or other insect, the flail portion is relatively wide. Since the flail portion is relatively wide and flexes about a line perpendicular to the strut and handle, it is frequently difficult to swat flies which have landed in corners such as the corner between a splash block in the sink or the corner between the counter top and splash block or sink and splash block. Whenever a fly or insect is in the area defined by a juncture between a vertical surface and horizontal surface the fly or insect is difficult to swat. Some insects such as roaches appear to be aware of this and travel under the protection of such junctures. The only convenient way to kill these insects is to use a spray, which of course, is not a good idea in kitchens since the spray may contaminate food and which many people do not think is a good idea in general.

In view of these considerations, there is a need for a fly swatter or insect swatter which is capable of killing flies or insects which have landed in or are crawling in corners.

SUMMARY OF THE INVENTION

It is an object of the instant invention to provide a new and improved fly swatter which can readily kill flies or insects in corners.

Upon further study of the specification and appended claims, further objects and advantages of this invention will become apparent to those skilled in the art.

The instant invention contemplates a fly swatter which includes a planar swatter assembly composed of a plurality of bristles. The plurality of bristles are attached to a flange having first and second portions, which portions can fold over one another so that the swatter assembly can configure itself to conform to a corner. The flange is connected to strut means to a handle.

The instant invention further contemplates means for optionally locking the flange portions so that the flanges remain in the same plane when the user feels that a relatively wide swatter assembly is necessary. When the user wishes to swat flies or insects in a corner, the lock is released allowing the flange portions to fold.

In addition, the instant invention contemplates strut means which are comprised of a pair of support arms with one arm attached to each flange. Moreover, the lock structure is configured to form part of a stop which prevents one flange portion from bending more than 90° with respect to the other flange portion.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
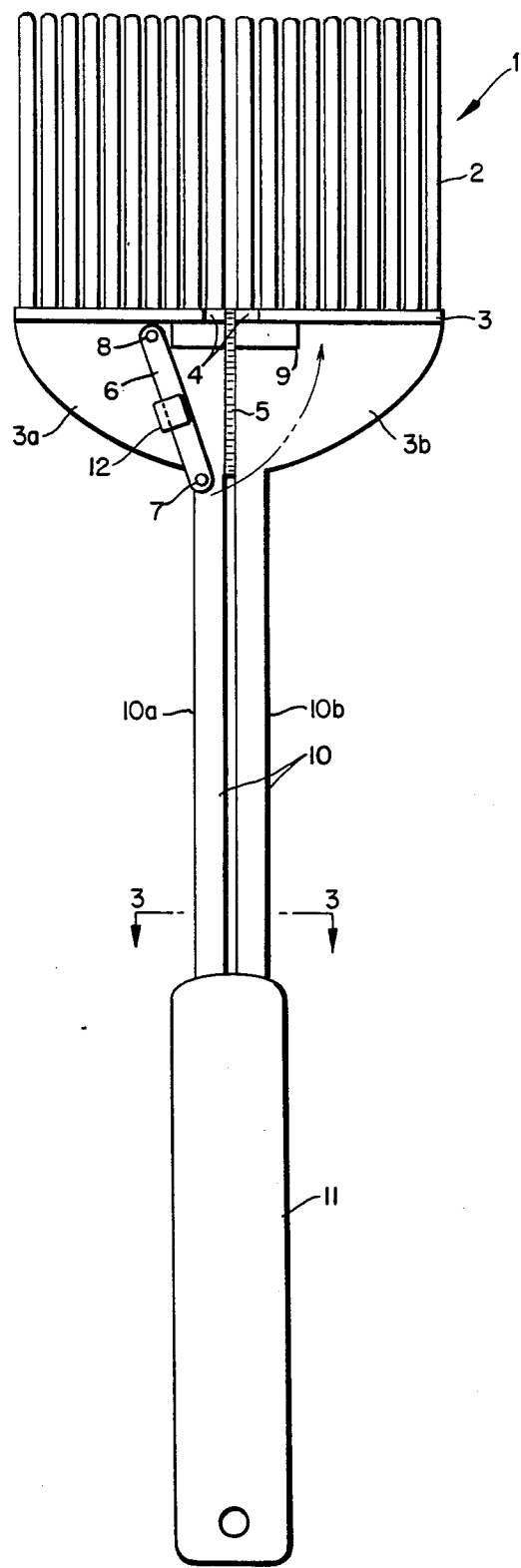
FIG. 1 is a front elevation of a fly swatter configured in accordance with the principles of the instant invention.

Referring now to FIG. 1, there is shown a fly swatter, designated generally by the numeral 1, configured in accordance with the principles of the instant invention. Preferably, the fly swatter of FIG. 1 is injection molded and with the exception of a locking assembly to be more fully described hereinafter is a single unitary piece.

Figure 2:
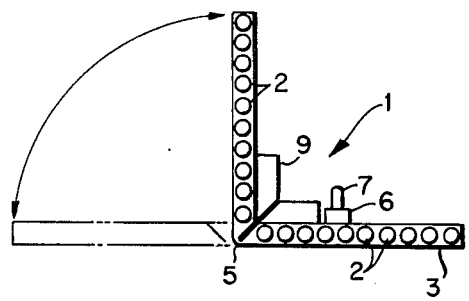
FIG. 2 is a top plan view of the hand of the fly swatter shown in FIG. 1 wherein the swatter is configured in a folded or corner mode.
Figure 3:
FIG. 3 is a cross section through a pair of struts taken along lines 3—3 of FIG. 1.

A plurality of round bristles serve as flails for killing flies or other insects. The round bristles generally lie in the same plane, are parallel to one another and are of the same length. The round bristles depend from a supporting boss 3, which supporting boss 3 is integral with a flange comprised of a first flange portion 3a and a second flange portion 3b. The boss 3 has opposed stop surfaces 4 formed therein which are at a 45° angle with respect to the boss 3. The first flange portion 3a and the second flange portion 3b are joined to one another by an integral hinge 5 which is simply a portion of the flange which is of reduced thickness. The hinge 5 allows the first flange portion 3a to fold relative to the second flange portion 3b as seen in FIG. 2. The stop surfaces 4 on the supporting boss 3 keep the flange portions 3a and 3b from folding through an angle more than about 90°. Consequently, the fly swatter 1 can configure the array of bristles 2 so as to conform to a 90° corner.

In order to facilitate folding of the flange portions 3a and 3b, each flange portion is attached to a separate one of the support arms 10a and 10b which forms a strut assembly 10 for connecting the flange portions to a handle 11. The support arms are not hinged to one another but are able to twist about their own axis so as to enable the flange portions 3a and 3b to readily fold about the hinge 5.

Figure 4:
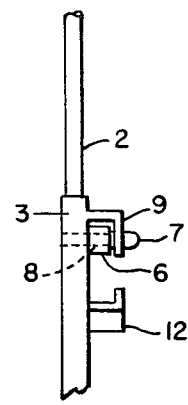
FIG. 4 is a fragmentary left side elevation of a locking arrangement used with the swatter of FIG. 1.

Since insects do not always congregate in corners, one may find it desirable to keep the bristles 2 all in the same plane. This is accomplished by a relatively rigid latch bar 6 which is pivoted to flange portion 3a by pivot 8. The flange 6 can swing from the position shown in FIG. 1 to a position such as that shown in FIG. 4 wherein it overlies flange 3a as well as flange 3b. This prevents the flanges from pivoting about hinge 5. A protruding shelf 9 forms a slot for receiving the bar 6 and holding the bar 6 in place by frictionally engaging the bar. As is seen in FIG. 2, the shelf 9 is divided into two parts and has 45° slanting surfaces which abutt one another when flange 3a is rotated at 90° with respect to flange 3b. A catch 12 is provided for frictionally holding the knob 6 so as to entirely overlie flange portion 3a when it is desired to allow the bristles and flange portions to assume the position of FIG. 2. Knob 7 is provided on the catch bar 6 so that one may rotate it from one position to the other.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fly or insect swatter comprising:
   handle means for holding the swatter,
   flail means secured to said handle means for killing flies and insects,
   said flail means comprising a plurality of spaced bristles arranged in a plane and connected to a flange means,
   said flange means comprising two flange portions, and
   pivot means interconnecting said flange portions for pivoting said flange portions, one relative to the other to assume a 90° degree configuration,
   whereby the swatter can be used to kill flies or insects in corners.

2. The swatter of claim 1 wherein the handle means is connected to the flange means by elongated strut means.

3. The swatter of claim 2 wherein the strut means comprises two support arms, each of which is attached to one of the flange portions.

4. The swatter of claim 1 further including means for selectively preventing one flange portion from folding with respect to the other flange portion.

5. The swatter of claim 4 wherein the preventing means is a bar which pivots across the two flange portions so as to prevent them from folding.

6. The fly or insect swatter set forth in claim 1 wherein:
   said pivot means comprises a reduced portion of said flange means.

7. The fly or insect swatter set forth in claim 1 in further combination with:
   stop means, one mounted on each of said flange means cooperating to prevent said flange portions from pivoting relative to each other to an angle more than 90° degrees.

8. The fly or insect swatter set forth in claim 1 wherein:
   said handle means, flange means and pivot means comprises a unitary piece.

* * * * *